United States Patent [19]
Meyer

[11] Patent Number: 4,997,507
[45] Date of Patent: Mar. 5, 1991

[54] METHOD AND APPARATUS FOR BONDING LAMINAR WORKPIECES

[75] Inventor: Werner Meyer, Munich, Fed. Rep. of Germany

[73] Assignee: Herbert Meyer GmbH & Co. KG, Munich, Fed. Rep. of Germany

[21] Appl. No.: 359,226

[22] Filed: May 31, 1989

[30] Foreign Application Priority Data

Jun. 3, 1988 [DE] Fed. Rep. of Germany ....... 3819027

[51] Int. Cl.⁵ .................. B32B 31/08; B32B 31/20
[52] U.S. Cl. ................................ 156/286; 156/285;
156/311; 156/324; 156/382; 156/498;
156/583.5
[58] Field of Search ............... 156/87, 285, 286, 382,
156/324, 497, 499, 580, 583.5, 311, 498

[56] References Cited

U.S. PATENT DOCUMENTS

| 4,402,778 | 9/1983 | Goldsworthy | 156/273.7 |
| 4,402,785 | 9/1983 | Withers | 156/286 |
| 4,432,828 | 2/1984 | Siempelkamp | 156/286 |
| 4,511,419 | 4/1985 | Kuhlmann | 156/382 |

FOREIGN PATENT DOCUMENTS

| 823088 | 7/1949 | Fed. Rep. of Germany . |
| 1504342 | 8/1962 | Fed. Rep. of Germany . |
| 1146242 | 3/1963 | Fed. Rep. of Germany . |
| 6941387 | 11/1971 | Fed. Rep. of Germany . |
| 2648724 | 10/1976 | Fed. Rep. of Germany . |
| 2803521 | 1/1978 | Fed. Rep. of Germany . |
| 2214716 | 8/1974 | France . |

Primary Examiner—Michael W. Ball
Assistant Examiner—Michele K. Yoder
Attorney, Agent, or Firm—Kenyon & Kenyon

[57] ABSTRACT

An apparatus and method for bonding laminar workpieces has a feed station, a heating and pressing station with two heating zones, and a delivery station with a cooling zone. A lower conveyor belt is driven through the feed station and the heating and pressing station. An upper conveyor belt is driven through the heating and pressing station, and is mounted a sufficient distance above the lower conveyor belt to carry the workpieces therebetween. Pressing rollers are mounted in the heating and pressing station for pressing the heated workpieces moving therethrough. The adhesive between the laminations of the workpieces is heat-activated in the heating zones of the workpieces is heat-activated in the heating zones to bond the laminations of the workpieces. The heated and pressed workpieces are then moved by conveyor belts through a cooling zone to resolidify the adhesive between the laminations of the workpieces. A pair of suction nozzles, each having an elongated aperture, are each mounted adjacent to one side of the conveyor belts. The suction nozzles suck air from the space between the conveyor belts to introduce at least a partial vacuum therein, to facilitate the formation of uniform bonds between the adhesive and the laminations of the workpieces.

28 Claims, 3 Drawing Sheets

METHOD AND APPARATUS FOR BONDING LAMINAR WORKPIECES

FIELD OF THE INVENTION

The present invention relates to methods and apparatus for bonding and, in particular, to methods and apparatus for bonding sheet-type workpieces, such as textiles, foam materials, plastic films and the like.

BACKGROUND INFORMATION

An apparatus for intermittently bonding sheet-type workpieces is shown in German Application No. DE G 69 41 387. One of the workpieces has an adhesive on one side thereof and is placed with the adhesive against the other workpiece. The two workpieces are carried between two conveyor belts and through heated pressing plates. The bonded workpieces are then moved into a discharge station on a lower conveyor belt.

German Patent No. DE 2648724 C2 shows a continuous workpiece bonding apparatus. The workpieces are superimposed on one another and fed between two conveyor belts through a heating zone. The heating zone has heated plates mounted adjacent to the moving workpieces. The heated workpieces are passed through a pair of pressing rolls which presses the workpieces together. The bonded workpieces are then moved into a delivery station where they are passed through a cooling zone.

Bonding apparatus such as those described above, may be employed, for example, for bonding materials for making garments and for bonding other types of materials supplied in rolls. German Application No. DE-AS 1504342 shows an example of such bonding apparatus.

One type of adhesive used for bonding sheet-type workpieces are fusion adhesives which are ordinarily provided in liquid, film or powder form. The fusion adhesives are usually applied to the bonding side of one of the workpieces before the workpieces are placed together.

One problem associated with known sheet-type workpiece bonding apparatus is uniformly transferring heat to the workpieces to be bonded. If the apparatus moves the workpieces through a heating and pressing zone, it is desirable for the heat to be transferred uniformly to the workpieces. If the workpieces are not uniformly heated, the fusion adhesive will likely not develop a uniform bond. The layer of fusion adhesive should be heated above at least a threshold temperature throughout the layer to achieve adequate bonding strength. Therefore, if the workpieces are not uniformly heated, but, for example, are insufficiently heated in certain areas, the workpieces likely will not be adequately bonded.

Another problem associated with known sheet-type workpiece bonding apparatus is uniformly and rapidly cooling the workpieces after performing a heating and pressing operation. Rapid cooling of, and controlled removal of thermal energy from the bonded workpieces is necessary to quickly initiate the crystallization process of the fusion adhesive, and to obtain a uniform crystal structure in the resolidified adhesive. Control over the cooling process is critical because the strength of the bond formed by the fusion adhesive may depend substantially in part on the degree of uniformity of its crystal structure developed during the cooling and solidification process. Generally, the strength of the adhesive bond increases with the degree of uniformity in the crystal structure of the resolidified adhesive.

Until now, known sheet-type workpiece bonding apparatus have generally not satisfactorily provided a means for uniformly heating sheet-type workpieces to be bonded together, nor have they provided a satisfactory means for rapidly and uniformly cooling sheet-type workpieces following a heating and pressing operation. These problems are especially critical, for example, in processing garment parts. In making garments, a "sandwich" process is frequently employed, where, for example, two interlinings and two top cloth parts are superimposed on one another into a four-ply stack with fusion adhesive applied between the adjacent plies. The four-ply stack is then moved, for example, by conveyor belts through a heating and pressing zone. If the four-ply stack is not uniformly heated, or, likewise, if after heating and pressing it is not uniformly and rapidly cooled, the fusion adhesive between the stacks likely will not develop uniform bonds. As a result, the durability and strength of the laminated material will be lessened and, thus, the laminated material will likely make a poor quality garment.

Therefore, it is an object of the present invention to overcome the problems and drawbacks of known sheet-type workpiece bonding methods and apparatus.

SUMMARY OF THE INVENTION

The present invention is directed to an apparatus for bonding laminated workpieces. The apparatus comprises conveying means for carrying the workpieces through the apparatus. Heating means of the apparatus are mounted adjacent to the conveying means for heating the workpieces carried on the conveying means. The apparatus further comprises vacuum means mounted on the apparatus adjacent to the conveying means for introducing at least a partial vacuum around the workpieces carried on the conveying means, for facilitating the formation of uniform bonds between the laminations of the workpieces.

In one embodiment of the invention, the vacuum means includes at least one suction nozzle defining therein an elongated aperture, and exhaust means for sucking air and/or vapor through the aperture. The vacuum means is mounted adjacent to the conveying means so that the aperture faces the conveying means. The vacuum means thus introduces at least a partial vacuum around the workpieces carried on the conveying means, by sucking air and/or vapor from around the workpieces through the elongated aperture and, in turn, through the exhaust means.

In another embodiment of the present invention, the conveying means includes a first conveyor belt rotatably mounted on the apparatus, and a second conveyor belt rotatably mounted on the apparatus above the first conveyor belt. The first and second conveyor belts therefore define a space therebetween for carrying the workpieces through the apparatus upon rotation of the conveyor belts. The suction nozzle of the vacuum means is mounted on the apparatus adjacent to one side of the first and second conveyor belts, for sucking air and/or vapor from the space defined between the conveyor belts for introducing at least a partial vacuum therein.

In yet another embodiment of the invention, the vacuum means includes two suction nozzles. The suction nozzles are mounted to the apparatus on opposite sides, respectively, of the first and second conveyor belts. The two suction nozzles thus suck air and/or vapor from either side of the space defined between the first and second conveyor belts through their respective elongated apertures and, in turn, through the respective exhaust means, for introducing at least a partial vacuum therein.

The present invention is also directed to a method of bonding laminar workpieces wherein the workpieces have at least two layers of sheet-type material superimposed on one another with a layer of adhesive material therebetween. The method comprises the steps of heating the workpieces, pressing the heated workpieces, and then cooling the heated workpieces. The method further comprises the step of sucking air away from the area of the workpieces during at least one of the steps of heating, pressing or cooling the workpieces, for facilitating the formation of bonds between the adhesive and the layers of sheet material of the workpieces.

In one embodiment of the invention, air is sucked away from the area of the workpieces during each of the three steps of heating, pressing and cooling the workpieces.

One advantage of the method and apparatus of the present invention is that it provides a reliable means of uniformly bonding the laminations or layers of the workpieces and, therefore, ordinarily provides a better quality laminar workpiece than known bonding methods and apparatus. Frequently, pockets of air and/or vapor develop within the adhesive material between the laminations of the workpieces The air and/or vapor pockets usually reduce the thermal conductivity of the surrounding adhesive material and/or laminations. As a result, those portions of the adhesive and/or laminations in the area of the air or vapor pockets usually do not become sufficiently heated and, therefore, do not develop an adequate bond. Accordingly, the adhesive bond is often not uniform across the laminations, and results in a poor quality workpiece.

This problem is especially critical with fusion adhesives that can be heat-activated at lower temperatures. For example, some fusion adhesives require a processing temperature of about 120° C. That temperature is relatively low and usually does not affect the materials ordinarily used to make the laminations for the workpieces and, therefore, such fusion adhesives are desirable. However, with known bonding apparatus, one drawback of using a low processing temperature is that the temperature is not usually sufficient to overcome the problems associated with air and/or vapor bubbles that develop in the adhesive. As a result, known methods and apparatus frequently provide a non-uniform bond between the laminations of the workpieces at low processing temperatures.

The apparatus and method of the invention, however, provides a means for overcoming the thermal conductive problems of air and/or vapor bubbles in the adhesive layer. By sucking the air from around the workpieces, and thus creating at least a partial vacuum in that area, the apparatus of the present invention usually substantially sucks away the vapor and/or air pockets in the adhesive layers. As a result, the thermal conductivity across the laminations becomes more uniform and, therefore, the adhesive develops a more uniform bond and a better quality workpiece.

Other advantages of the present invention will become apparent in view of the following detailed description and drawings taken in connection therewith.

DETAILED DESCRIPTION

Figure 1:
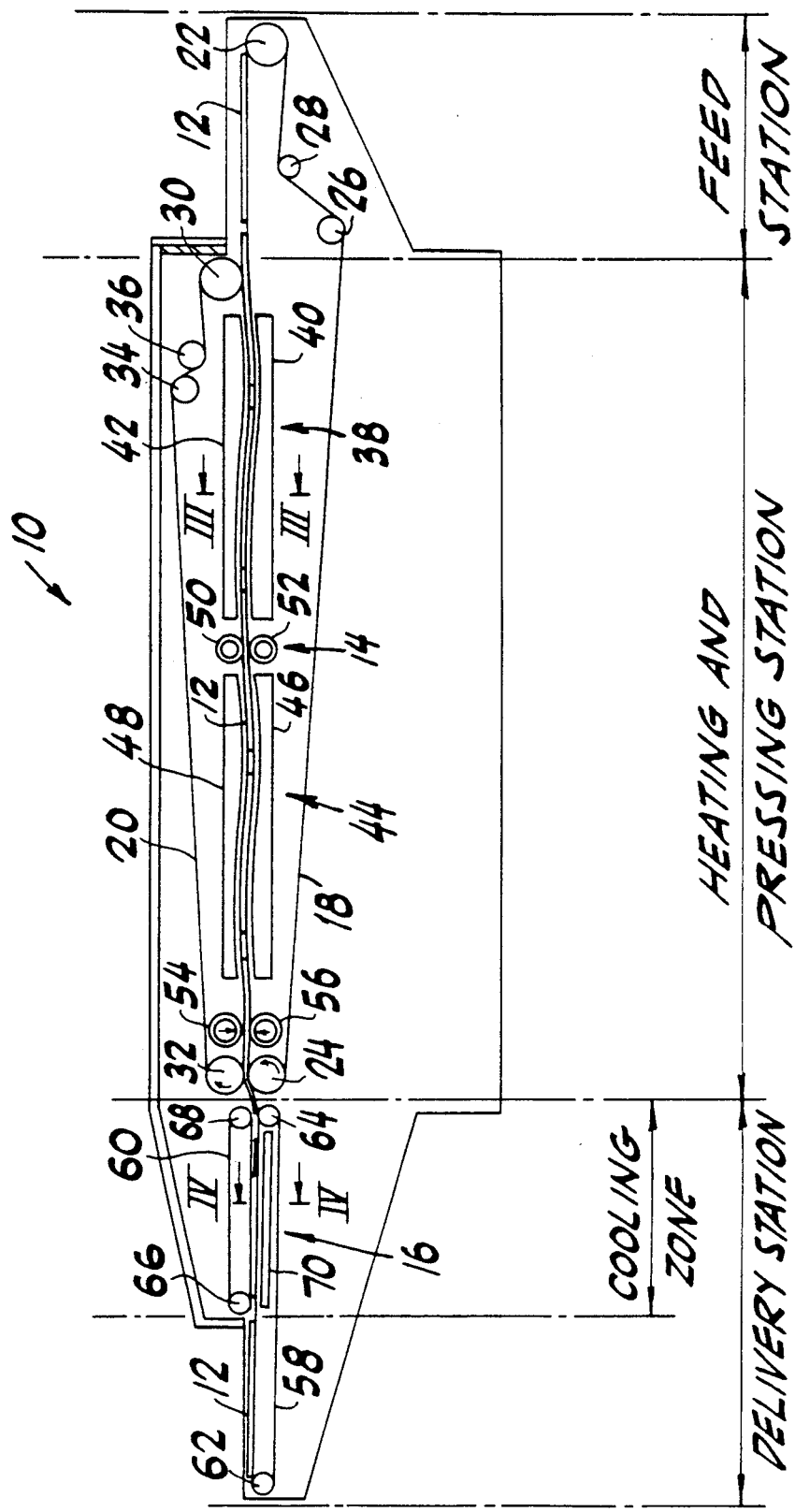
FIG. 1 is a schematic view of an apparatus embodying the invention for bonding sheet-type workpieces.

In FIG. 1, an apparatus embodying the present invention for bonding sheet-type workpieces into laminated sheets, is indicated generally by the reference numeral 10. The apparatus 10 comprises several processing stations for continuously processing one or more laminated sheet-type workpieces, shown typically as 12,12. Moving from right to left on FIG. 1, the workstations include a feed station, a heating and pressing station which includes two heating zones, and a delivery station which includes a cooling zone. The workpieces 12,12 are passed by conveyor belts through the feeding station and into the heating and pressing station, then through the cooling zone and, finally, the laminated workpieces are moved into the delivery station, as will be described in further detail below.

The workpieces 12,12 are of a sheet-type laminated construction wherein at least two or more sheets are superimposed on one another with a layer of adhesive interposed therebetween. The individual sheets may be made, for example, of fabric or plastics, and the like. The adhesive is preferably a fusion adhesive that first melts to bond the adjacent sheets together when heated above a threshold temperature, and then resolidifies to form a bonded laminated workpiece when cooled down.

The apparatus 10 comprises a first conveyor belt assembly and a second conveyor belt assembly, indicated generally as 14 and 16, respectively, for moving the workpieces 12,12 through the apparatus. The first conveyor belt assembly 14 includes a lower conveyor belt 18 and an upper conveyor belt 20. The lower conveyor belt 18 is rotatably driven by a first drive roller 22 mounted in the entrance to the feed station. A first guide roller 24 is, in turn, rotatably mounted in the exit of the heating and pressing zone to support the conveyor belt 18 on that end. Likewise, second and third guide rollers, 26 and 28, respectively, are rotatably mounted in the feed station in front of the first drive roller 22 to also support the conveyor belt 18. The lower conveyor belt 18 thus is continuously driven by the drive roller 22 over the guide rollers 24, 26 and 28, respectively, through the feed station and the heating and pressing zone.

The upper conveyor belt 20 is mounted above the lower conveyor belt 18 and is driven only through the heating and pressing zone. The upper conveyor belt 20 is rotatably driven by a second drive roller 30 rotatably mounted in the entrance of the heating and pressing zone, and spaced above the lower conveyor belt 18. The upper conveyor belt 20 is, in turn, rotatably driven over a fourth guide roller 32 rotatably mounted in the exit of the heating and pressing zone. The upper conveyor belt 20 is then directed back towards the drive roller 30 over a fifth guide roller 34 and sixth guide roller 36, respectively, both rotatably mounted adjacent to the drive roller 30. As shown in FIG. 1, the lower conveyor belt 18 and upper conveyor belt 20 are spaced apart vertically a sufficient distance in order to allow the workpieces 12,12 to fit therebetween. The workpieces 12,12 are placed on the lower conveyor belt 18 in the feed station which, in turn, carries the workpieces into the heating and pressing zone. Each workpiece 12 is then carried through the heating and pressing zone between the lower conveyor belt 18 and upper conveyor belt 20, as will be described in further detail below.

The conveyor belts 18 and 20 are preferably air-impermeable, teflon-coated glass or Kevlar ® fabric belts that have a relatively low coefficient of friction. Therefore, in the event that during a bonding process any adhesive flows onto one of the belts, the adhesive can be easily removed therefrom.

The apparatus 10 further includes within the heating and pressing zone a first heating zone indicated generally as 38. The heating zone 38 has mounted therein a first heating box 40 and a second heating box 42. The first heating box 40 is mounted inside the loop of the lower conveyor belt 18, and the second heating box 42 is mounted opposite the lower heating box 40, inside the loop of the upper conveyor belt 20. As shown in FIG. 1, each heating box has a heating surface facing the other heating box and the sections of the conveyor belts 18 and 20 carrying the workpieces 12,12. Each heating surface has a generally sinusoidal cross-sectional profile, which is the mirror image of the opposite heating surface.

The apparatus 10 further includes a second heating zone, indicated generally as 44, located next to the first heating zone 38. The second heating zone 44 comprises a third heating box and a fourth heating box, 46 and 48, respectively. The third heating box 46 is mounted inside the loop of the lower conveyor belt 18 adjacent to the portion of the conveyor belt carrying the workpieces 12,12. The fourth heating box 48 is mounted above the third heating box 46 and inside the loop of the upper conveyor belt 20. Like the first and second heating boxes, the third and fourth heating boxes also each have a heating surface facing the other heating box and the sections of the conveyor belts 18 and 20 carrying the workpieces 12,12. As can be seen, each heating surface has a generally sinusoidal cross-sectional profile, and is the mirror image of the opposite heating surface. The heating boxes 40, 42, 46 and 48 are provided to heat the workpieces 12,12 carried between the lower conveyor belt 18 and upper conveyor belt 20, and which pass through the first and second heating zones 38 and 44, respectively. The heating boxes are of a type known to those skilled in the art and are controllable to set the temperature of their respective heating surfaces in order to sufficiently heat the workpieces 12,12, and thus cause the fusion adhesive therein to form a sufficient bond.

The apparatus 10 further comprises a pair of pre-pressing rollers 50 and 52, mounted between the first and second heating zones 38 and 44. The pre-pressing roller 50 is mounted inside the loop of the upper conveyor belt 20, and the pre-pressing roller 52 is mounted inside the loop of the lower conveyor belt 18 and opposite the roller 50. The pre-pressing rollers 50 and 52 are adjustable in a manner known to those skilled in the art, in order to selectively exert pressure on the lower and upper conveyor belts 18 and 20, respectively, and, therefore, the workpieces 12,12 that are carried therebetween.

The apparatus 10 also comprises a pair of main pressing rollers 54 and 56 mounted on the exit side of the second heating zone 44. The main pressing roller 54 is mounted inside the loop of the upper conveyor belt 20, and the main pressing roller 56 is mounted opposite the roller 54 inside the loop of the lower conveyor belt 18. Like the pre-pressing rollers 50 and 52, the main pressing rollers 54 and 56 are also adjustable in order to selectively exert pressure on the conveyor belts 18 and 20 and, therefore, the workpieces 12,12 carried therebetween.

The second conveyor belt assembly 16 of the apparatus 10 is provided to move the workpieces 12,12 through the cooling zone and, in turn, into the delivery station. The second conveyor belt assembly 16 comprises a lower conveyor belt 58 and an upper conveyor belt 60. As shown in FIG. 1, the loop of the lower conveyor belt 58 extends throughout the entire delivery station, whereas the loop of the upper conveyor belt 60 extends only throughout the cooling zone. The lower conveyor belt 58 is rotatably driven by a third drive roller 62 rotatably mounted in the exit side of the delivery station, and is rotatably supported on the entrance side of the cooling zone by a seventh guide roller 64. Likewise, the upper conveyor belt 60 is rotatably driven by a fourth drive roller 66 mounted in the exit side of the cooling zone, and is rotatably supported on the entrance side of the cooling zone by an eighth guide roller 68. As can be seen, the drive roller 66 and guide roller 68 and, thus, the upper conveyor belt 60, are mounted a sufficient distance above the lower conveyor belt 58, in order to fit the workpieces 12,12 therebetween.

The apparatus 10 further includes in the cooling zone a cooling plate 70 mounted inside the loop of the lower conveyor belt 58 and underneath the upper conveyor belt 60. The cooling plate 70 is of a type known to those skilled in the art, and may be controlled to regulate the temperature of the cooling zone for cooling the workpieces 12,12 passing therethrough. Optionally, another cooling plate (not shown) like the cooling plate 70 can be mounted above that cooling plate, inside the loop of the upper conveyor belt 60, if necessary, to uniformly and/or more rapidly cool the workpieces 12,12.

In the operation of the apparatus 10, the workpieces 12,12 are placed on the conveyor belt 18 in the feed station. The conveyor belt 18 carries each workpiece 12 into the heating and pressing zone where the workpiece is then carried between the lower conveyor belt 18 and upper conveyor belt 20. Each workpiece 12 is pre-heated in the first heating zone 38 by the two heating plates 40 and 42. Then, with the adhesive at least partially heat activated, each workpiece 12 is pre-pressed through the pre-pressing rollers 50 and 52. The pre-pressing rollers 50 and 52 press the layers of each workpiece 12 together, thus facilitating the bonding of the fusion adhesive therebetween. The pre-pressed workpieces 12,12 are then heated again in the second heating zone 44 by the third and fourth heating plates 46 and 48, respectively. In the second heating zone, each layer of adhesive is thoroughly and sufficiently heated to facilitate developing a uniform bond across each layer of sheet material. The workpieces 12,12 are then driven through the main pressing rollers 54 and 56, where they are pressed a second time. Each workpiece 12 is then carried into the cooling zone by the conveyor belt assembly 16 between the lower conveyor belt 58 and upper conveyor belt 60. In the cooling zone, the cooling plate 70 preferably rapidly and uniformly cools each workpiece 12, in order to facilitate the formation of uniform bonds between the fusion adhesive and each layer of sheet material therein. After the cooling zone, the conveyor belt 58 carries the laminated and bonded workpieces 12,12 into the end of the delivery station where they are removed from the apparatus 10.

Figure 2:
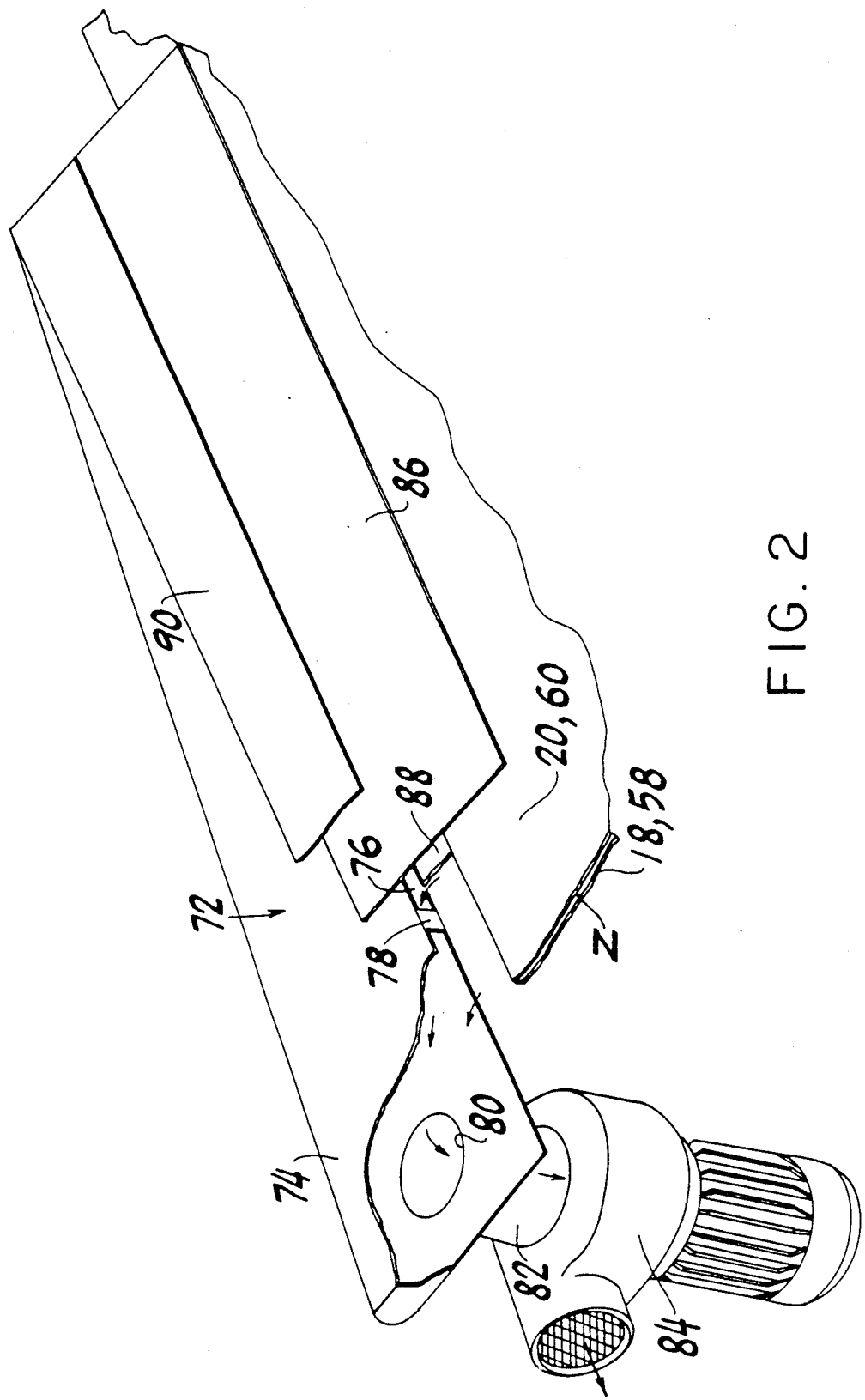
FIG. 2 is a partial perspective view of the apparatus of FIG. 1, illustrating the suction nozzle of the invention for creating a partial vacuum in the space between the conveyor belts carrying the workpieces.

Turning to FIG. 2, in order to more uniformly and rapidly bond the layers of the workpieces 12,12, the apparatus 10 further comprises means for creating a partial vacuum in the space between the conveyor belts 18 and 20 and/or the conveyor belts 58 and 60, for carrying the workpieces 12,12. The vacuum means of the apparatus 10 comprises at least one suction nozzle, indicated generally as 72. The suction nozzle 72 is mounted adjacent to one side of the respective conveyor belts 18 and 20 and/or 58 and 60. As shown in FIG. 2, the suction nozzle 72 is substantially trough-shaped and comprises a U-shaped suction member 74. The suction member 74 has formed along one edge thereof a split-type aperture 76 for drawing air therethrough, as will be described further below. The suction member 74 is preferably made of sheet metal and is mounted adjacent to the edge of the conveyor belts so that the aperture 76 faces the conveyor belts, as shown in FIG. 2. The suction member further includes several support members, shown typically as 78, spaced apart along the edge defining the aperture 76 and connecting the upper and lower surfaces of the suction member 74. The suction member 74 has formed in its bottom surface on one end thereof an exhaust port 80. The apparatus 10 further comprises an exhaust duct 82 connected on one end to the exhaust port 80, and an exhaust turbine or fan 84 connected to the other end of the exhaust duct 82. The exhaust turbine 84, therefore, draws air through the slit-type aperture 76 of the suction member 74 which, in turn, is sucked through the exhaust port 80 and exhaust duct 82.

The apparatus 10 further comprises an upper seal strip 86 and a lower seal strip 88. The upper seal strip 86 is mounted to the top surface of the suction member 74 by means of an adhesive strip 90 As shown in FIG. 2, the upper seal strip 86 extends along a substantial portion of the upper edge of the aperture 76 and projects outwardly therefrom, so that it rests on top of either the upper conveyor belt 20 in the heating and pressing zone, or the upper conveyor belt 60 in the cooling zone. The lower seal strip 88 is likewise mounted to the bottom surface of the suction member 74 by another adhesive strip 90. The lower seal strip 88 extends along a substantial portion of the lower edge of the aperture 76 and projects outwardly therefrom, so that it contacts the underside of either the lower conveyor belt 18 in the heating and pressing zone, or the lower conveyor belt 58 in the cooling zone.

In the operation of the apparatus 10, one side of either the conveyor belts 18 and 20, or the conveyor belts 58 and 60, carrying the workpieces 12,12, passes between the upper and lower sealing strips 86 and 88, respectively. Therefore, when the exhaust turbine 84 is operating, it draws air from the interspace between the conveyor belts, indicated generally as Z, and, therefore, from the workpieces 12,12 seated therebetween. The suction nozzle 72, therefore, creates a partial vacuum in the interspace Z by sucking the air and/or vapor therefrom. As a result, any air or vapor pockets within the adhesive material between the layers of sheet material 12,12 are likely to be removed by the suction of the nozzle 72. Accordingly, the apparatus 10 provides a means of more uniformly conducting heat throughout each workpiece and, therefore, will normally provide a more uniform bond between the adjacent layers of sheet material than known sheet-type workpiece bonding apparatus. As will be recognized by those skilled in the art, the suction nozzle 72 can be mounted adjacent to one or both sides of each respective pair of conveyor belts, depending upon the degree of suction required.

Figure 3:
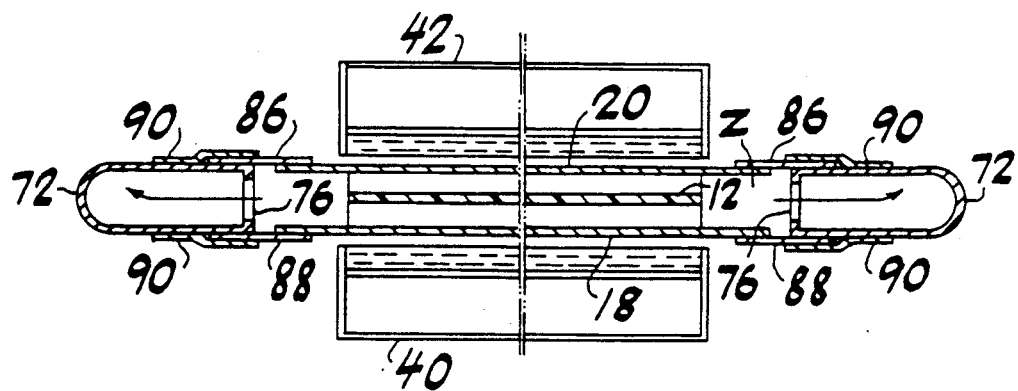
FIG. 3 is a cross-sectional view of the apparatus of FIG. 1 taken along the line III—III of FIG. 1.

Turning to FIG. 3, a cross-sectional view of the apparatus 10 is shown wherein the apparatus comprises a pair of suction nozzles 72,72 mounted on either side of the conveyor belts 18 and 20 in the first heating zone. As can be seen, the workpiece 12 is made of two layers of sheet material with a layer of fusion adhesive therebetween. The suction nozzles 72,72 therefore draw the air and/or vapor from either side of the workpiece 12 in order to permit the fusion adhesive to rapidly develop a more uniform bond. The suction nozzles 72,72 may extend across the entire heating and pressing station or, if desired, they may extend only over a part thereof.

Figure 4:
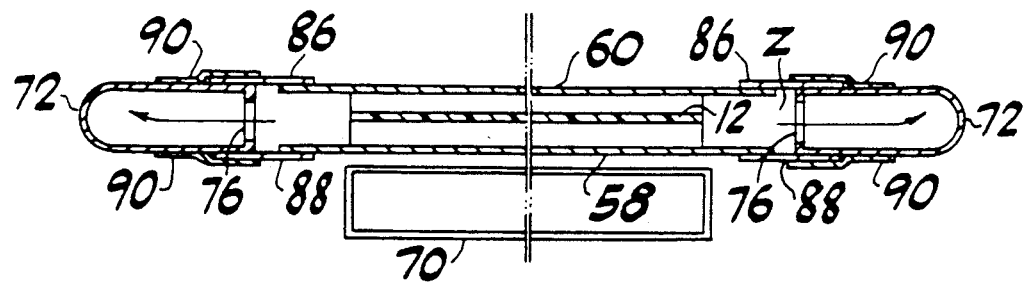
FIG. 4 is a cross-sectional view of the apparatus of FIG. 1 taken along the line IV—IV of FIG. 1.

In FIG. 4, a cross-sectional view of the apparatus 10 is shown wherein the apparatus comprises another pair of suction nozzles 72,72 mounted on either side of the conveyor belts 58 and 60 in the cooling zone. Like the suction nozzles 72,72 in the heating and pressing station, the suction nozzles 72,72 in the cooling zone suck the air and/or vapor from either side of the workpieces 12,12 and, therefore, facilitate the rapid formation of a uniform bond between the fusion adhesive and the layers of sheet material.

The surfaces of the sealing strips 86 and 88 preferably have a low coefficient of friction so that the conveyor belts will easily slide relative thereto. Therefore, like the conveyor belts 18, 20, 58 and 60, the surfaces of the sealing strips 86 and 88 are preferably either coated with, or made of teflon or other plastic material having a low coefficient of friction.

The degree to which a vacuum should be created in the interspace Z depends in part on the type of sheet material of the workpieces 12,12, and the number of layers of sheet material superimposed on one another in each workpiece. Therefore, in order to create optimal vacuum conditions for each type of workpiece 12, the exhaust turbine 84 is preferably adjustable in a manner known to those skilled in the art to control the rate of air flow therethrough.

It should be noted that the apparatus of the present invention is not limited to sheet-type workpiece bonding apparatus that operate continuously, but may equally be employed with apparatus that operate intermittently. Likewise, the apparatus 10 may equally be employed to bond a workpiece having layers of sheet material that are fed into the feed station continuously from a roll, as opposed to the separate workpieces 12,12 as shown in the drawings. Moreover, the apparatus of the present invention is not limited to the configuration of the two conveyor belt assemblies 14 and 16, but, if desired, the apparatus may include more than two, or only one conveyor belt assembly. For example, it may be desirable to have one lower conveyor belt that extends from the entrance of the feed station, through the heating and pressing station, and into the exit of the delivery station. Likewise, the upper conveyor belt would extend from the entrance of the heating and pressing station to the exit of the cooling zone.

What is claimed is:

1. An apparatus for bonding workpieces, wherein each workpiece has at least two layers of sheet material superimposed on one another with adhesive therebetween, said apparatus comprising:
   a first conveyor belt rotatably mounted on said apparatus;
   a second conveyor belt rotatably mounted on said apparatus above said first conveyor belt, said first and second conveyor belts defining a space therebetween for carrying the workpieces through said apparatus upon rotation of said first and second conveyor belts;
   heating means for heating said workpieces carried between said first and second conveyor belts; and
   vacuum means for creating at least a partial vacuum between the layers of sheet material, said vacuum means including
      a first member supported in contacting relationship with said first conveyor belt and extending in the direction of rotation thereof, and
      a second member supported in contacting relationship with said second conveyor belt and extending in the direction of rotation thereof,
   said vacuum means further defining an aperture therein located adjacent to the outermost edges of said belts and extending in the direction of rotation thereof, said vacuum means being adapted to draw air through said aperture and thus through said first and second members and through the space between the outermost edges of said belts, to introduce at least a partial vacuum between the layers of sheet material for facilitating the bonding between the adhesive and the layers of sheet material of the workpieces.

2. An apparatus as defined in claim 1, wherein said aperture is defined by a suction nozzle, said suction nozzle being coupled to said first and second members, said aperture being located between said first and second members, said suction nozzle being connectable to exhaust means for sucking air through said aperture.

3. An apparatus as defined in claim 2, wherein said apparatus includes two of said suction nozzles, each of said suction nozzles having said first and second members coupled thereto, said suction nozzles being mounted on said apparatus on opposite sides, respectively, of said first and second conveyor belts.

4. An apparatus as defined in claim 2, wherein said suction nozzle is mounted on said apparatus adjacent to said heating means for creating at least a partial vacuum in the space defined between said first and second conveyor belts in the area where the workpieces are heated.

5. An apparatus as defined in claim 2, said apparatus further comprising:
   cooling means for cooling the workpieces after being heated.

6. An apparatus as defined in claim 5, wherein said suction nozzle is mounted on said apparatus adjacent to said cooling means for creating at least a partial vacuum in the space defined between said first and second conveyor belts in the area where the workpieces are cooled.

7. An apparatus for bonding workpieces having layers of sheet material and adhesive therebetween, said apparatus comprising:
   a frame;
   a first belt rotatably mounted to said frame;
   a second belt rotatably mounted to said frame and spaced apart from said first belt to carry the workpieces therebetween;
   heating means supported adjacent to said first and second belts for heating the workpieces carried on said belts for facilitating the formation of bonds between the adhesive and the layers of sheet material of the workpieces; and
   vacuum means for drawing air and/or vapor from between the layers of sheet material of the workpieces on said belts, said vacuum means including
      a first sealing surface supported in contact with said first belt, and
      a second sealing surface spaced below the first sealing surface and supported in contact with said second belt,
   said vacuum means defining an aperture therein, said aperture being located adjacent to the outermost edges of said belts and extending in the direction of rotation thereof, said vacuum means being adapted to draw air and/or vapor through said aperture and thus between said first and second sealing surfaces, through the space between the outermost edges of said first and second belts and between the layers of sheet material of the workpieces for facilitating the formation of bonds between the adhesive and the layers of sheet material.

8. An apparatus as defined in claim 7, wherein said vacuum means includes a suction conduit coupled in fluid communication with said aperture, said suction conduit being connectable to exhaust means for drawing air and/or vapor through said aperture.

9. An apparatus as defined in claim 8, wherein each of said first and second sealing surfaces is defined by a sealing strip mounted to said suction conduit on one side thereof and extending substantially across the length of said aperture and projecting outwardly therefrom.

10. An apparatus as defined in claim 9, wherein said apparatus includes two of said suction conduits, said suction conduits being mounted on said frame on opposite sides, respectively, of said belts.

11. An apparatus as defined in claim 7, wherein each of said belts is made of a fabric material and the surfaces thereof are coated with a plastic material having a low coefficient of friction.

12. An apparatus as defined in claim 11, wherein the surfaces of said belts are coated with teflon.

13. An apparatus as defined in claim 9, wherein said sealing strips are made of a plastic material having a low coefficient of friction.

14. An apparatus as defined in claim 13, wherein said sealing strips are made of a material having teflon.

15. An apparatus for bonding laminated workpieces, comprising:
   a first belt rotatably supported thereon;
   a second belt rotatably supported thereon and spaced above said first belt to carry the workpieces therebetween;
   heating means supported adjacent to said first and second belts for heating the workpieces carried therebetween;
   a vacuum member supported adjacent to said first and second belts, said vacuum member including a nozzle located adjacent to the outermost edges of said belts and extending in the direction of rotation thereof, said vacuum member further including, a first sealing surface extending outwardly therefrom in contacting relationship with said first belt, and a second sealing surface spaced below said first sealing surface and extending outwardly therefrom in contacting relationship with said second belt, said vacuum member being adapted to draw air through the space between the outermost edges of said belts, through said first and second sealing surfaces and through said nozzle to introduce at least a partial vacuum between the laminations of the workpieces to facilitate the formation of uniform bonds therebetween.

16. An apparatus as defined in claim 15, said apparatus further comprising:

cooling means for cooling the workpieces after being heated by said heating means.

17. An apparatus as defined in claim 15, said apparatus further comprising:

pressing means for pressing the workpieces in a vertical plane thereof.

18. An apparatus as defined in claim 15, wherein said vacuum member further includes exhaust means for sucking air and/or vapor through said aperture.

19. An apparatus as defined in claim 18, wherein said vacuum means includes two of said suction nozzles and two of said respective exhaust means, said suction nozzles being mounted to said apparatus on opposite sides, respectively, of said first and second belts.

20. A method of bonding laminar workpieces wherein the workpieces have at least two layers of sheet-type material superimposed on one another with a layer of adhesive material therebetween, said method comprising the following steps:

carrying the workpieces between two rotating belts, one belt being spaced away from the other to fit the workpieces therebetween;

heating the workpieces carried by the belts;

pressing the heated workpieces carried by the belts;

cooling the heated workpieces carried by the belts; and maintaining a space between the outermost edges of the belts and drawing air through the space to introduce at least a partial vacuum between the layers of sheet-type material of the workpieces during at least one of the steps of heating, pressing or cooling the workpieces, for facilitating the formation of bonds between the adhesive and the layers of sheet material of the workpieces.

21. A method of bonding laminar workpieces as defined in claim 20, wherein:

during the step of heating the workpieces, at least a partial vacuum is introduced between the layers of sheet-type material of the workpieces for facilitating the formation of bonds between the adhesive and the layers of sheet material of the workpieces.

22. A method of bonding laminar workpieces as defined in claim 21, wherein during the step of cooling the heated workpieces, at least a partial vacuum is introduced between the layers of sheet-type material of the workpieces for facilitating the formation of bonds between the adhesive and the layers of sheet material of the workpieces.

23. A method of bonding laminar workpieces as defined in claim 22, wherein during the step of pressing the workpieces, at least a partial vacuum is introduced between the layers of sheet-type material of the workpieces for facilitating the formation of bonds between the adhesive and the layers of sheet material of the workpieces.

24. A method of bonding laminar workpieces, said method comprising the following steps:

carrying the workpieces on two belts, one belt being spaced away from the other to fit the workpieces therebetween;

heating the workpieces carried on the belts;

cooling the heated workpieces carried on the belts; and maintaining a space between the outermost edges of the belts and drawing air through the space to introduce at least a partial vacuum between the laminations of the workpieces during at least one of the steps of heating or cooling the workpieces, for facilitating the formation of uniform bonds between the laminations of the workpieces.

25. A method of bonding laminar workpieces as defined in claim 24, comprising the additional step of:

pressing the heated workpieces carried on the belts.

26. A method of bonding laminar workpieces as defined in claim 25, wherein a partial vacuum is introduced between the laminations of the workpieces during the step of heating the workpieces.

27. A method of bonding laminar workpieces as defined in claim 25, wherein a partial vacuum is introduced between the laminations of the workpieces during the step of cooling the heated workpieces.

28. A method of bonding laminar workpieces as defined in claim 25, wherein a partial vacuum is introduced between the laminations of the workpieces during the step of pressing the heated workpieces.

* * * * *